United States Patent [19]

Benedikt et al.

[11] Patent Number: 4,473,451
[45] Date of Patent: Sep. 25, 1984

[54] VAPOR PHASE CHLORINATION OF POLYOLEFINS

[75] Inventors: George M. Benedikt, Lakewood; Donald M. Kurtz, Akron, both of Ohio

[73] Assignee: The BF Goodrich Company, Akron, Ohio

[21] Appl. No.: 402,474

[22] Filed: Jul. 28, 1982

[51] Int. Cl.$^3$ .............................. C08F 8/22; C08J 3/28
[52] U.S. Cl. ............................... 204/159.18; 525/357; 524/497
[58] Field of Search ..................... 204/159.18; 525/357

[56] References Cited

U.S. PATENT DOCUMENTS

| 2,928,819 | 3/1960 | Noeske | 204/159.18 |
| 3,163,631 | 12/1964 | Schwander et al. | 525/356 |
| 3,887,533 | 6/1975 | Mukerjee | 525/357 |
| 3,909,486 | 9/1975 | Lever et al. | 524/586 |
| 3,988,296 | 10/1976 | Bethea et al. | 524/409 |
| 4,011,379 | 3/1977 | Bow et al. | 204/159.17 |
| 4,029,862 | 6/1977 | Liu et al. | 204/159.18 |
| 4,179,386 | 4/1980 | Schoen | 525/356 |

FOREIGN PATENT DOCUMENTS 1415236 11/1975 United Kingdom .

Primary Examiner—John C. Bleutge
Assistant Examiner—A. H. Koeckert
Attorney, Agent, or Firm—J. Hughes Powell, Jr.; N. W. Shust

[57] ABSTRACT

An improved vapor phase process for chlorination of polyethylene in a fluidized bed is accomplished by chlorinating a mixture of powdered polyethylene and finely divided inorganic compounds having a dielectric constant of greater than about 40 and specific conductivity of greater than $10^{-13}$ and less than $10^{-1}$ ($\Omega^{-1}$ cm$^{-1}$) such as titanium dioxide, with chlorine, optionally under actinic light, at an initial temperature from about 20°C. to about 70° C. and raising the temperature of the reaction to at least about the crystalline melting point of the polyethylene and continuing the reaction until the polyethylene contains greater than 25 to 45 weight percent bound chlorine.

9 Claims, No Drawings

VAPOR PHASE CHLORINATION OF POLYOLEFINS

BACKGROUND OF THE INVENTION

The many advantages of vapor phase chlorination of polyolefins over chlorination in solution are obvious and has resulted in substantial work in this area. While there are advantages to the vapor phase process, there are different problems in the vapor phase process. These include, particularly in fluidized beds, deposit of polymer on reactor walls, unsatisfactory mixing of the reactants, problems with heat transfer and polymer agglomeration resulting in channeling and ultimately collapse of the fluidized bed. Prior art processes are described below.

An attempt to eliminate problems in fluid bed processes for chlorinating polyethylene is described in U.S. Pat. No. 2,928,819 wherein the use up to 80%, preferably 50%, by weight of magnesia, aluminum sulfate, sodium chloride and the like is proposed, but the use of such large amounts of inorganic materials also introduce handling and other problems, including separation of these materials from the polymer and are not satisfactory for a commercial process.

U.S. Pat. No. 3,163,631 describes a process for halogenating a polyolefin in a finely divided state at an elevated temperature in the presence of an anti-static agent. The halogenation is achieved preferably by means of two stages: a partial halogenation at a temperature below the temperature of the onset of the endothermal fusion phenomenon characteristic for the treated polymer, in the presence, or better, in the absence of the anti-static agent, followed by intensive halogenation at a temperature such as defined above, in the presence of an anti-static agent that is a quaternary ammonium salt. This allegedly prevents degradation of the polymer during the reaction, and char formation at high temperatures. The patent teaches that during the reaction, the polymer often adheres to the walls of the reaction vessel but in the form of a very crumbly and readily detachable cake.

U.S. Pat. No. 3,887,533 is directed to chlorination of polyolefins in the solid state in a fluidized or moving bed. Thermostable chlorinated polyolefins are said to be obtained in accordance with this invention by reacting pulverulent polyolefins with gaseous chlorine in a fluidized layer or moving bed, in the presence of 0.01 to 3.0 weight percent of certain saturated aliphatic, aromatic, aliphatic-hydroxi-carboxylic and aromatic hydroxicarboxylic acids, alkali metal or alkaline earth metal salts thereof, and anhydrides thereof. The patent teaches that the process may be conducted in the presence of talc, silica gel, barium sulfate, polyvinyl chloride, and polyfluorohydrocarbons.

Two later U.S. Pat. Nos. 4,029,862 and 4,197,386 suggest using in the fluidized bed polyolefins having certain combinations of defined parameters including flowability, bulk density, surface area, density, melt index, hexane extractable waxes, etc., to obtain alleged improved processes and products.

British Patent Specification No. 1,415,236 discloses a method for the low temperature post chlorination in the dry state of polyvinyl chloride (PVC) in the presence of pigments known for use in subsequent compounding of the chlorinated PVC. Carbon black and titanium dioxide are listed as such compounding pigments for chlorinated PVC. These are used in the chlorination process in amounts as little as 0.001 part per 100 parts of resin. The examples show use of 0.02 parts of carbon black, 0.01 part of titanium dioxide, and use of 0.01 part of carbon black and 0.05 part of titanium dioxide together at a chlorination temperature of 50° C.

However none of these processes is completely satisfactory and an improved process for fluid bed chlorination of polyolefins such as polyethylene that eliminates deposits on reactor walls, provides improvement in mixing in the bed, that has good heat transfer, minimum agglomeration and results in an improved uniformly chlorinated polyolefin with improved processing and physical characteristics is still desired.

SUMMARY OF THE INVENTION

An improved vapor phase process for the chlorination of polyolefins such as polyethylene, particularly in fluidized bed processes with finely divided polyolefins, whereby improvement is obtained in bed mixing and heat transfer with minimum polymer deposition on reactor walls and polymer agglomeration, essentially eliminating channeling and bed break down, is realized by chlorinating a mixture of a finely divided inorganic compound having a dielectric constant greater than about 40, a specific conductivity of greater than $10^{-13}$ but less than $10^{-1}(\Omega^{-1}cm^{-1})$, mixed with a finely divided polyolefin.

DETAILED DESCRIPTION

Use of any ethylene polymer is contemplated. Low density, high density, linear, branched, and the like. The polyethylene used may have a molecular weight from about 20,000 to several million, preferably from about 50,000 to 200,000. The melt index will range from 0.01 to less than 30, preferably from about 0.2 to 18. The density may be from about 0.90 to 0.97, preferably 0.93 to 0.965. The crystalline melting point is from about 100° C. to 140° C., preferably 120° C. to 136° C. The average particle size will be from greater than 50, as greater than 75 to less than 800 microns, preferably 100 microns to less than 600 microns. For uniform chlorine contents it is preferred to use polyethylenes with a narrow range of average particle sizes no greater than about 200 microns, more preferably no greater than 100 microns, based on the average particle size. For example, a polyethylene with a mixture of particle sizes from 100 to 250 microns is satisfactory, as is a mixture of sizes from 500 to 600 microns, although the larger particle size may require a longer reaction time to reach the desired chlorine content. The term polyethylene is understood to include copolymers of ethylene with other alpha olefins, preferably containing 3 to 6 carbon atoms and in amounts less than 10 weight percent, for example, 5% butene-1. Other polyolefins include polypropylene and polybutene-1.

The inorganic compounds used have dielectric constants of greater than about 40, preferably greater than 100, specific conductivity values of greater than $10^{-13}$ but less than $10^{-1}(\Omega^{-1}cm^{-1})$, in the temperature range of 20°-140° C. Contemplated are compounds having the general formula $ABO_3$ wherein A is Na, K, Rb, Ca, Bi, Sr, Ba, Pb, Gd; and B is Ti, Sn, Zr, Nb, Ta, W; and mixed compounds wherein A and B can be more than one element as $Pb(Zr,Ti)O_3$. (See Chapter on "Ferroelectrics", Kirk-Othmer ENCYCLOPEDIA OF CHEMICAL TECHNOLOGY, 3rd Edition, Vol. 10, pages 1 to 30, published 1980, by Wiley & Sons, New York.) Such materials include titanium dioxide, barium titanate, lead titanate, barium-lead titanate-niobate, and the like. These materials meet the above criteria. Inorganic materials that do not meet these criteria and are otherwise satisfactory in the process of this invention are silica, 4.5 dielectric constant; barium sulfate, 11.4 dielectric constant; calcium carbonate, 6.0 dielectric constant. Titanium compounds are preferred.

Particularly useful, for example, are rutile titanium dioxide and barium titanate. The amounts used will be from at least 1 to about 10 to 15 or more weight parts per 100 weight parts of polyethylene. Large amounts may be used if preferred, but are not normally necessary. The particle size normally is from about 0.05 to 2 microns. Particularly useful are particles of 0.2±0.05 micron size.

The reaction is generally continued until the polymers contain between about 25 and about 45 weight percent chlorine and this is determined by the change in polymer density, the amount of HCl evolved during the chlorination, etc.

Inert gases such as nitrogen, carbon dioxide and the like may be used as a diluent. Unreacted $Cl_2$ may be recycled, and this may include some HCl byproduct which will build up over a period of time. This normally is bled off to keep the concentration in the reactor preferably at a concentration of preferably less than 50%, HCl, more preferably about 25 to 30%. In the process, minimum concentration of oxygen should be in the feed streams and reactor. The maximum amount of oxygen in the reactor should be below 300 ppm, preferably below 150 ppm.

The chlorination is started with chlorine at a temperature between about 20° C. and 70° C. and the temperature is raised to at least about the crystalline melting point of the polyethylene. The usual operating temperature of the reaction at this stage is about 10° C. above the starting polyethylene crystalline melting point, or from about 110° C. to about 150° C., depending on the initial polyethylene melting point. One benchmark to use in determining at what point to raise the reaction temperature is when the polyethylene contains about 15–20 weight percent bound chlorine.

Vapor phase bulk chlorination of polyethylene in accordance with this invention is contemplated for a variety of conditions and equipment, both batch and continuous. Any means known to those skilled in the art for vapor phase chlorination of polyolefins may be used to conduct the reaction, for example, a rotary drum, a moving bed, horizontal stirred reactor, but more preferably in a fluidized bed of the polyethylene and defined inorganic compound. The fluidized bed reaction normally is conducted at about atmospheric pressure or higher and typically at flow rates of about 0.2 to 5 feet per second, preferably about 1 to 1.1 feet per second.

Light can be used to initiate the reaction of the chlorine and sulfur dioxide with the polyolefin. While light from daylight sources, incandescent bulbs and the like may be used, ultra-violet light is more efficient and this is preferably used initially in the reaction at least until the reaction temperature has reached the polyolefin melting point and may be used throughout the reaction. The reaction also can be initiated by generating free radicals thermally as by the decomposition of peroxide and azo catalysts. Thermally generated chlorine radicals are also sufficient to initiate the reaction. This process is particularly useful with actinic light initiated reaction.

At the conclusion of the reaction, the polymer is removed from the reactor and the unreacted and byproduct gases must be removed as by stripping. The reaction temperature of the polymer is preferably lowered to about 100° C. to 110° C., and the polymer is purged with nitrogen or stripped under vacuum to remove unreacted $Cl_2$ and byproduct HCl.

In the fluidized bed process for chlorination of polyethylene mixed with the defined inorganic compounds, improvement is obtained in bed mixing of the reactants and heat transfer, with minimum polymer deposition on reactor walls and minimum agglomeration in the fluidized bed, essentially eliminating undesirable channeling and bed breakdown, to provide an improved process and product.

The resulting chlorinated polyolefin contain about 25 to 45 weight percent chlorine with the optimum being about 35 to 38 weight percent. These products are elastomeric and readily cured, for example, with peroxides. The 4 minute ML Mooney values usually range from about 15 to 150.

In the following examples the powdered polyethylene was blended with titanium dioxide, barium titanate and the other compounds as described and charged to a fluid bed reactor and purged with nitrogen. The reactions were started at room temperature by introducing chlorine. The temperature of the bed was increased by heating the reactor with a circulating bath and heating the incoming gas streams. As the temperature reached the melting point of the polyolefin, the bed and reaction temperature was controlled by the temperature of the circulating bath and/or diluting the reactants with nitrogen. The end of the reaction was determined by the total uptake of chlorine required to reach the desired chlorine content. The maximum temperature was maintained near or above the melting temperature of the polyolefin to assure a reduced residual crystallinity and the desired chlorine content. At the end of the reaction a purge with nitrogen at about 100° C. degasses the polymer powder to contain less than 40 ppm of $Cl_2$ and HCl, preferably less than 10 ppm. The resulting products were white or light tan.

EXAMPLE I 70 grams of high density polyethylene powder having a density of 0.955, a crystalline melting point of 130° C. by differential scanning calorimetry, a melt index of 15 and a particle size of 125–250 microns was dry blended with 2.1 grams of titanium dioxide (rutile, particle size 0.18 microns) and 0.7 grams of calcium stearate and placed in a 2" diameter glass fluid bed column provided with a heating jacket through which silicon oil was circulated. The fluid bed was connected to a cyclone and further to a caustic scrubber. The fluid bed was provided on the outside with a source of UV light having the main wavelength at 356 nanometers. The powder was fluidized for 30 minutes by introducing approximately 10 liters per minute of nitrogen. A mixture of 13 liters per minute of chlorine, having less than 100 ppm oxygen and 8.4 liters per minute of nitrogen, having less than 100 ppm oxygen was used as both fluidizing and reactive medium. The gas mixture was fed into the reactor at room temperature while using the UV light source. The temperature of the fluid bed increased rapidly to 46° C. after which it started to decrease. At that point, heat was provided via the jacket and incoming gases so that the temperature of the bed reached 125° C. within 55 minutes from the start. At this point, the reaction exotherm brought the bed to 140° C. and this temperature was maintained by cooling the jacket temperature to 110° C. and by lowering the chlorine to nitrogen ratio. The reaction was stopped at 75 minutes and purged with nitrogen at 100° C. During the reaction, excellent mixing in the bed was observed and there were on polymer deposits on the reactor wall. The final product was white and contained 38% chlorine. It was completely soluble in toluene at 50° C., (except the inorganic additive) and it had a residual crystallinity below 2%. The polymer had a Mooney value (ML 1+4 @ 100° C. ASTM No. D1646) of 43.

EXAMPLE II

Example I was repeated but without titanium dioxide. As the reaction progressed, a layer of polymer material was deposited on the reactor wall, and at 125° C., the polymer started to agglomerate and the fluidized bed broke down and the reaction had to be stopped.

EXAMPLE III 40 grams of a high density polyethylene powder having a density of 0.952, a melt index of 4.3, and a particle size of 106–250 microns, was dry blended with 3 weight parts of titanium dioxide per 100 weight parts of polyethylene and 0.5 parts of calcium stearate and chlorinated in a 1" fluid bed reactor similar to the one used in Example I except only daylight was present. After 67 minutes the temperature reached 134° C. During this run the chlorine flow rate used was 7 liters per minute and 7 liters per minute of nitrogen. During the last 15 minutes the chlorine flow rate was increased to 8 liters per minute. After 100 minutes the polymer contained 36% bound chlorine.

EXAMPLE IV

Example III was repeated using 3 phr of talc as the additive instead of titanium dioxide. Heavy build-up on the reactor walls and subsequent agglomeration and bed breakdown resulted.

EXAMPLE V

Example I was repeated except that 0.5 phr powdered lead stearate was used in place of calcium stearate with the 3 phr of titanium dioxide. Using 7 liters per minute of chlorine and 7 liters per minute of nitrogen, the temperature was brought to 125° C. at 55 minutes. The reaction exotherm at this point brought the temperature to 139° C. This temperature was maintained through the end of the reaction at 75 minutes. The product was white and contained 34% chlorine.

EXAMPLE VI 70 grams of the same polyethylene used in Example III was blended with 3 phr of carbon black and chlorinated using ultra violet light and flow rates of 7 liters per minute chlorine and 6 liters per minute of nitrogen. The temperature was slowly increased and it reached 123° C. after 50 minutes. At this point the fluidization stopped suddenly, the material agglomerated, and the fluidized bed broke down.

EXAMPLE VII

Example I was repeated except that barium titanate (4.2 g., particle size 0.9 micron) was used instead of titanium dioxide. A well mixing fluid bed with no wall deposits was observed throughout the reaction. The reaction product was white and contained 35% chlorine.

These chlorinated polyethylenes find uses in various applications such as wire and cable compounds, hose compounds, polymer blends with improved impact resistance and the like.

We claim:

1. In a vapor phase process for chlorinating polyolefins with chlorine, the improvement comprising conducting the chlorination reaction in a fluidized bed of (1) powdered polyethylene and (2) a finely divided inorganic titanium compound at an initial reaction temperature of from about 20° C. to about 70° C., raising the reaction temperature to at least about the crystalline melting point of the polyethylene and continuing the reaction until the chlorinated polyethylene contains about 25 to about 45 weight percent chlorine, wherein said polyethylene contains 0 to 10 weight percent copolymerized alpha olefins containing 3 to 6 carbon atoms, has a density from about 0.90 to about 0.97, a crystalline melting point of about 100° C. to about 140° C., a melt index of 0.01 to about 30 and an average particle size from about 50 to less than 800 microns, the titanium compounds are selected from the group consisting of titanium dioxide, barium titanate, lead titanate and barium-lead titanate-niobate, present in amounts from about 1 to 15 weight parts per 100 weight parts polyethylene, having an average particle size of about 0.01 to 10 microns, dielectric constants greater than about 40 and specific conductivity values greater than $10^{-13}$ but less than $10^{-1} (\Omega^{-1} cm^{-1})$ at a temperature of 20° to 140° C.

2. A process of claim 1 wherein the polyethylene is a homopolymer having a density from about 0.93 to about 0.965, a melt index of 0.2 to 18 and a particle size from about 100 to less than 600 microns, the titanium compound present in amounts from about 1 to 10 weight parts per 100 weight parts of polyethylene, is titanium dioxide or barium titanate, having a particle size of about 0.05 to 2 microns, and a dielectric constant greater than 100, and the reaction temperature is raised to about 100° C. to about 150° C. to complete the chlorination of the polyethylene.

3. A process of claim 2 wherein the polyethylene has a crystalline melting point from 120° to 136° C. and an average particle size no greater than 200 microns.

4. A process of claim 1 wherein the inorganic compound is rutile titanium dioxide.

5. A process of claim 2 wherein the inorganic compound is rutile titanium dioxide.

6. A process of claim 3 wherein the inorganic compound is rutile titanium dioxide.

7. A process of claim 1 wherein the inorganic compound is barium titanate.

8. A process of claim 2 wherein the inorganic compound is barium titanate.

9. A process of claim 3 wherein the inorganic compound is barium titanate.

* * * * *